March 7, 1961 J. L. CARROLL ET AL 2,973,578
KNIFE
Filed Aug. 31, 1955
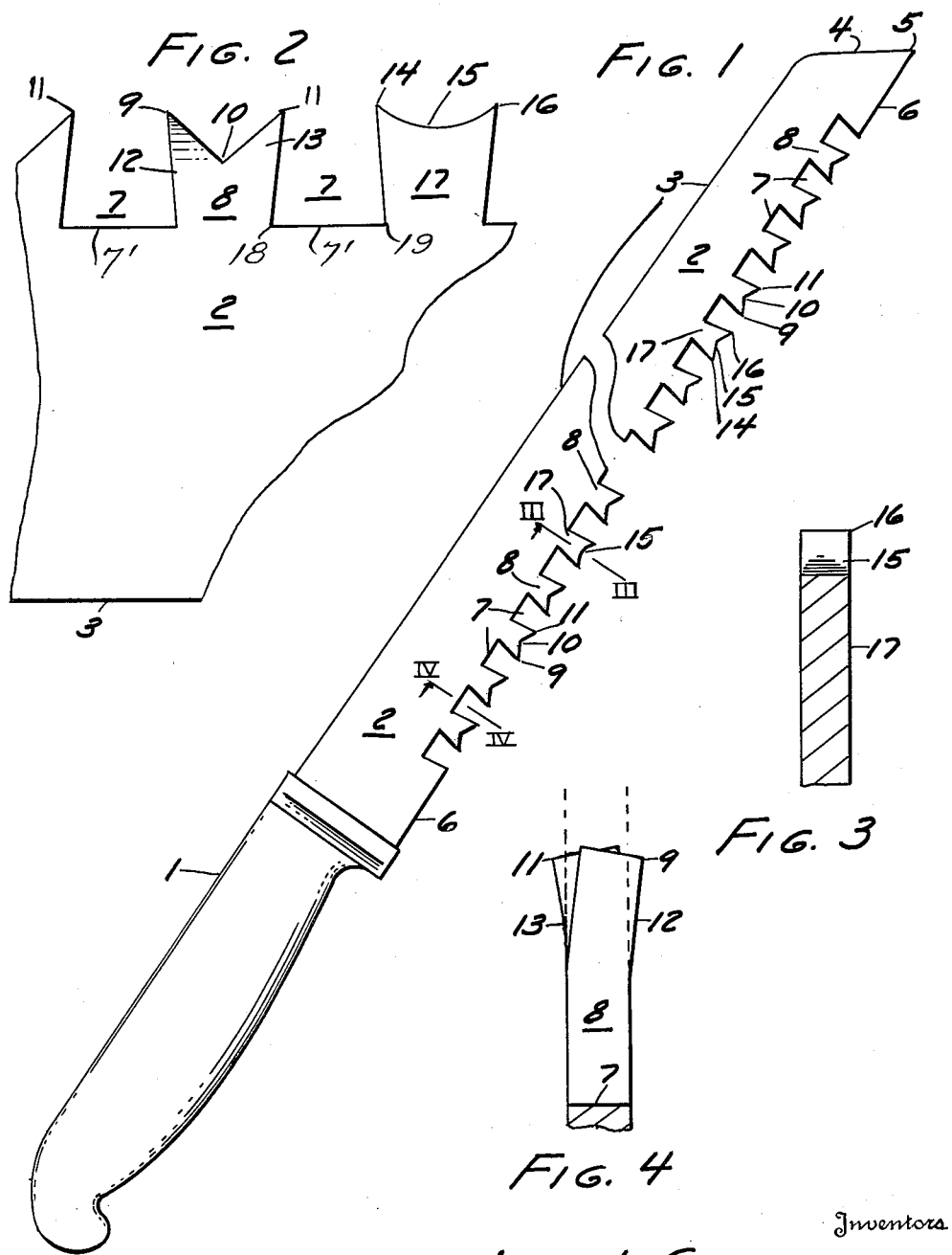
Inventors
JOHN L. CARROLL
CHARLES D. WHITCOMB
By
Attorney United States Patent Office 2,973,578
Patented Mar. 7, 1961

2,973,578

KNIFE

John L. Carroll and Charles D. Whitcomb, Fremont, Ohio, assignors to Quikut, Inc., Fremont, Ohio, a corporation of Ohio Filed Aug. 31, 1955, Ser. No. 531,806

1 Claim. (Cl. 30—355)

This invention relates to rigid blade type of cutting tool having a directing handle.

This invention has utility when incorporated in a tool preferably in which there is an active edge of interruptions herein carried through as of uniform thickness with the blade proper or backing for such edge. Lineally of the blade are two types of point-providing edges, V-point and concave, both grouped approximately in a straight line. The V-point pairs are with a slight set or bend toward the tip, preferably being bent to an extent of less than the thickness of the blade. Co-planar with the blade, slightly concaved-top teeth may be considered as effective in medial cutting. Slightly dovetail or trapezoidal notches spacing these edge pairs of teeth may to some extent supplement the cutting action while also being effective in clearing the cut of fines. Speed in severing is achieved for material having a fiber of considerable strength and possessing body supplemented with fragile characteristics. Slicing off frozen food portions to meet desired quantity sections is handled with a minimum of effort.

Referring to the drawings:

Fig. 1 is a side elevation of a knife embodying the invention features, a portion being broken away;

Fig. 2 is a fragment of the knife of Fig. 1 in enlarged side elevation, showing the two types of cutting edges;

Fig. 3 is a partial section from the line III—III, Fig. 1, of the cutting edge as co-planar with the blade; and Fig. 4 is a partial section from the line IV—IV, Fig. 1, of the slightly set cutting edge detail.

A grip or directing handle 1 has extending thereinto and fixedly anchored therewith a metal blade with a body portion 2 defining a plane having a generally straight back 3 with an abruptly narrowing free end 4 to a rather sharp tip 5.

Along front 6 between the handle 1 and the tip 5 is the effective working portion of the tool. Symmetrically spaced notches 7 are of trapezoidal form. Spacing these notches 7 are shown two general types of two-tip providing edges. Notch spacer 8 as it widens in its extent away from the root of the notch 7 has tip 9 spaced by a V-clearance 10 from a companion tip 11. Outward from the root of the V-clearance 10, the tip 9 has a slight pitch or offset pitch 12 of in a range of say up to 10%, while there is for the tip 11 a reverse similar offset 13.

The shown embodiment knife edge has the notch spacers 8 in groups of four, then a single tooth, comprising an edge or tip 14, spaced by a concave face 15 from a second edge or tip 16 as end bounds for a body portion 17. This portion or tooth 17 is coplanar with the body 2 of the blade. Notch 7 depth ranges 5/16".

In practice, the handle 1 is plastic, and the trapezoidal notches 7 have corners 11, 18, 19, and 14 where the base distance 7' between corners 18 and 19 is greater than the distance between the corners or tips 11 and 14 of the teeth. These bases or roots 7' of notches 7 approximate a straight line in parallel spacing from the tips of the two sets of teeth. The blade may be type 410 stainless steel with a Rockwell hardness, C scale, of 43 to 47 maximum, and of thickness .040". This means that each acute edge 9, 11, 14, 16 is .040" long for the two series of teeth. The V-notch 10 is for only about half the body or depth of the teeth 8. The base of the teeth 8, 17 may be taken as 3/16".

For example, a tool or knife according to this invention may have a root straight line base of the trapezoidal spaces 7 of about 1/4" and its narrowed top may be about 3/16" as a gap portion between the teeth, the bounding portions of which are sharp at right angles to the plane of the respective faces of the knife blade. This angle face relation is carried out fully for the teeth 17 and for the teeth 8 as insignificantly varying therefrom in the outer half slight offsets. There is thus maintained thruout the lineal extent of the tool, a continuity of active shear-action teeth portions at the outer acute tips thereof for severing portions or sections from a wide variety of frozen foods.

The operator may use the tip 5 to mark the region as selected for a line of severance. The tool may then be used as a knife in bringing the active teeth portions into lineal contact across the food item in carrying through for the selected line. Slicing course, or lineal shifting of the blade may be adopted for more or less length of strokes as the operator may find advantageous. The active edges 14, 16 act directly on the line, and the offset for the edges 9, 11 is so minor as to relieve the blade body from frictional binding as entering the cut or slicing. The frozen character of the item of work usually provides lubrication characteristics for easing effort on strokes of the blade. The rigidity of the item as frozen, is normally against such easying away from the cut, so the fine particles tend to cluster in the trapezoidal notches 7 and dislodge therefrom as riding clear of the cut. It is thus seen that even package wrap is away from contaminating either face of the cut.

What is claimed and it is desired to secure by Letters Patent is:

A blade having a plurality of teeth along a cutting edge, said teeth being shaped similar to equally-sized isosceles trapezoids with a cutting corner located at each of the two corners of the longer base of each trapezoid, said substantially trapezoidal shaped teeth being of two different types, one type being located along the cutting edge of said blade between at least two of the other type, said one type of substantially trapezoidal tooth having its two longer base cutting corners spaced by a shallow U-shaped notch and being entirely in the plane of said blade, and said other type of substantially trapezoidal tooth having its two longer base cutting corners spaced by a shallow V-shaped notch and said cutting corners being offset on opposite sides of said blade less than the width of said blade, all of said substantially trapezoidal teeth including their base cutting corners being of the same thickness as said blade throughout their entire extents, and all of said substantially trapezoidal shaped teeth and the substantially trapezoidal shaped notches between them being substantially equal in size.

References Cited in the file of this patent

UNITED STATES PATENTS

| Re. 3,566 | Boynton | July 27, 1869 |
|---|---|---|
| 87,910 | Clemson | Mar. 16, 1869 |
| 112,569 | Emerson | Mar. 14, 1871 |
| 149,562 | Bentley | Apr. 14, 1874 |
| 1,246,905 | Garlock et al. | Nov. 20, 1917 |
| 1,336,209 | Driver | Apr. 6, 1920 |
| 2,685,131 | Seeberger | Aug. 3, 1954 |
| 2,750,669 | Hohmann | June 19, 1956 |

FOREIGN PATENTS

| 251,184 | Great Britain | Apr. 29, 1926 |
|---|---|---|
| 651,689 | Germany | Oct. 16, 1937 |